(12) United States Patent
Prunchak et al.

(10) Patent No.: US 7,560,401 B2
(45) Date of Patent: Jul. 14, 2009

(54) FRITS AND OBSCURATION ENAMELS FOR AUTOMOTIVE APPLICATIONS

(75) Inventors: Robert Prunchak, East Windsor, NJ (US); Matthew Sgriccia, South Plainfield, NJ (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 11/738,184

(22) Filed: Apr. 20, 2007

(65) Prior Publication Data

US 2008/0261795 A1    Oct. 23, 2008

(51) Int. Cl.
  C03C 8/02    (2006.01)
  C03C 8/00    (2006.01)
  C03C 8/24    (2006.01)
  C03C 8/22    (2006.01)
  C03C 8/14    (2006.01)
  C03C 8/04    (2006.01)

(52) U.S. Cl. .............................. 501/21; 501/14; 501/15; 501/16; 501/17; 501/26; 65/33.6

(58) Field of Classification Search .................. 501/21, 501/14–17; 65/33.6
See application file for complete search history.

(56) References Cited

U.S. PATENT DOCUMENTS

| | | | |
|---|---|---|---|
| 4,554,258 A * | 11/1985 | Francel | ......................... 501/21 |
| 4,649,062 A | 3/1987 | Kosiorek et al. | |
| 4,684,388 A | 8/1987 | Boaz | |
| 4,684,389 A | 8/1987 | Boaz | |
| 4,828,596 A | 5/1989 | Reinherz | |
| 4,837,383 A | 6/1989 | Andrews | |
| 4,882,301 A | 11/1989 | Gettys et al. | |
| 4,892,847 A * | 1/1990 | Reinherz | ..................... 501/14 |
| 4,959,090 A | 9/1990 | Reinherz | |
| 4,959,270 A | 9/1990 | Hasegawa | |
| 4,970,178 A | 11/1990 | Klimas et al. | |
| 4,975,301 A | 12/1990 | Andrews et al. | |
| 4,983,196 A | 1/1991 | Stotka | |
| 5,093,285 A | 3/1992 | Murkens | |
| 5,141,798 A | 8/1992 | Chaumonot et al. | |
| 5,153,150 A | 10/1992 | Ruderer et al. | |
| 5,202,162 A | 4/1993 | Hart et al. | |
| 5,203,902 A * | 4/1993 | Murkens | .................... 65/60.53 |
| 5,208,191 A | 5/1993 | Ruderer et al. | |
| 5,250,475 A | 10/1993 | Zybell et al. | |
| 5,252,521 A * | 10/1993 | Roberts | ......................... 501/17 |
| 5,286,270 A | 2/1994 | Ruderer et al. | |
| 5,306,674 A | 4/1994 | Ruderer et al. | |
| 5,326,591 A | 7/1994 | Roberts | |
| 5,328,753 A | 7/1994 | Boaz | |
| 5,332,412 A | 7/1994 | Manabe et al. | |
| 5,334,412 A | 8/1994 | Korn et al. | |
| 5,342,810 A | 8/1994 | Merigaud et al. | |
| 5,346,651 A | 9/1994 | Oprosky et al. | |
| 5,346,933 A | 9/1994 | Knell | |
| 5,350,718 A | 9/1994 | Anquetil et al. | |
| 5,411,768 A | 5/1995 | Knell et al. | |
| 5,443,669 A | 8/1995 | Tunker | |
| 5,504,045 A | 4/1996 | Emlemdi et al. | |
| 5,512,521 A | 4/1996 | Fu et al. | |
| 5,518,535 A | 5/1996 | Boaz | |
| 5,549,929 A | 8/1996 | Scheibelhoffer et al. | |
| 5,559,059 A | 9/1996 | Ryan | |
| 5,578,533 A | 11/1996 | Manabe et al. | |
| 5,582,920 A | 12/1996 | Boaz | |
| 5,605,869 A | 2/1997 | Mangat et al. | |
| 5,616,417 A | 4/1997 | Ryan | |
| 5,629,247 A | 5/1997 | Prunchak | |
| 5,643,636 A | 7/1997 | Usui et al. | |
| 5,674,789 A | 10/1997 | Anquetil | |
| 5,698,025 A | 12/1997 | Boaz | |
| 5,698,026 A | 12/1997 | Boaz | |
| 5,702,520 A | 12/1997 | Boaz | |
| 5,707,907 A | 1/1998 | Brown | |
| 5,710,081 A | 1/1998 | Tunker | |
| 5,714,420 A | 2/1998 | Sakoske et al. | |
| 5,716,706 A | 2/1998 | Morris | |
| 5,725,919 A | 3/1998 | Roberts et al. | |

(Continued)

FOREIGN PATENT DOCUMENTS

CA    2269882    10/1999

(Continued)

OTHER PUBLICATIONS

Nagao, Yasuyuki "Properties of Bi12SiO20 Single Crystals Containing First Row Transition Metal", *Mat. Res. Bull.* 24:239-46, 1989.

(Continued)

*Primary Examiner*—Karl E Group
*Assistant Examiner*—Noah S Wiese
(74) *Attorney, Agent, or Firm*—RatnerPrestia

(57) ABSTRACT

Frits, obscuration enamel compositions including frits and automotive windshields having obscuration enamel compositions applied thereto are described. According to one or more embodiments, the obscuration enamel composition comprises a paste component and a frit component having $Bi_2O_3$, $SiO_2$ and $B_2O_3$ and being substantially free of $Na_2O$. In other embodiments, a reducing agent is included in the frit component. Obscuration enamels of some embodiments have a total solids content of at least 80% by weight.

20 Claims, No Drawings

U.S. PATENT DOCUMENTS

| | | | |
|---|---|---|---|
| 5,747,395 | A | 5/1998 | Smith et al. |
| 5,782,945 | A * | 7/1998 | Gavin et al. .................. 65/60.1 |
| 5,783,507 | A | 7/1998 | Sakoske |
| 5,817,586 | A | 10/1998 | Harada et al. |
| 5,827,789 | A | 10/1998 | Tunker et al. |
| 5,843,853 | A | 12/1998 | Heitmann et al. |
| 5,849,649 | A | 12/1998 | Poole |
| 5,900,319 | A | 5/1999 | Sakoske |
| 5,925,160 | A * | 7/1999 | Sakoske .................... 65/60.5 |
| 5,938,834 | A | 8/1999 | Boaz |
| 5,939,343 | A | 8/1999 | Tunker et al. |
| 5,968,659 | A * | 10/1999 | Sakoske et al. ............ 428/428 |
| 6,022,624 | A | 2/2000 | Sakoske |
| 6,057,037 | A | 5/2000 | Tunker et al. |
| 6,100,209 | A | 8/2000 | Bentem et al. |
| 6,105,394 | A | 8/2000 | Sridharan et al. |
| 6,124,224 | A | 9/2000 | Sridharan et al. |
| 6,176,919 | B1 | 1/2001 | Mason |
| 6,207,285 | B1 | 3/2001 | Sakoske et al. |
| 6,255,239 | B1 | 7/2001 | Sakoske |
| 6,270,854 | B1 | 8/2001 | Schelling et al. |
| 6,287,996 | B1 | 9/2001 | Chiba et al. |
| 6,346,493 | B1 | 2/2002 | Kniajer et al. |
| 6,357,868 | B1 | 3/2002 | Pfaff et al. |
| 6,387,513 | B1 | 5/2002 | Beyrle et al. |
| 6,391,141 | B2 | 5/2002 | Boaz |
| 6,402,823 | B1 | 6/2002 | Sainz et al. |
| 6,624,104 | B2 | 9/2003 | Sakoske |
| 6,699,606 | B2 * | 3/2004 | Machida et al. ............. 428/701 |
| 6,905,990 | B2 | 6/2005 | Sanichi et al. |
| 6,936,556 | B2 * | 8/2005 | Sridharan et al. ............. 501/14 |
| 2002/0004443 | A1 | 1/2002 | Bliss |
| 2003/0186799 | A1 | 10/2003 | Beyrle et al. |
| 2005/0153143 | A1 | 7/2005 | Minowa et al. |
| 2006/0191625 | A1 | 8/2006 | Kapp et al. |

FOREIGN PATENT DOCUMENTS

| | | |
|---|---|---|
| JP | 6234547 | 8/1994 |
| JP | 9-227214 | 2/1997 |
| JP | 2006-273653 | 12/2006 |
| WO | WO-03/097545 | 11/2003 |
| WO | WO-2004/018376 | 3/2004 |
| WO | WO-2005/073140 | 8/2005 |
| WO | PCT/US2008/056594 | 7/2008 |

OTHER PUBLICATIONS

Selvaraj, Ulagaraj "Epitaxial Crystallization fo Seeded Albite Glass", *J. Am. Ceram. Soc.* 74:1378-81, 1991.

* cited by examiner

FRITS AND OBSCURATION ENAMELS FOR AUTOMOTIVE APPLICATIONS

TECHNICAL FIELD

Embodiments of the invention relate to obscuration enamel compositions being substantially free of $Na_2O$. More particularly, embodiments pertain to enamel compositions including frit having a reducing agent in the frit and automotive windshields having obscuration enamel compositions described herein applied to the windshields.

BACKGROUND

Obscuration enamels are used on automotive glass to provide protection from ultra-violet rays which can deteriorate the adhesive glues that bond the glass to a vehicle body. Without such protection, such adhesive glues can degrade with exposure to the sun thereby compromising the integrity of the bond.

In addition to protecting the adhesive glues, obscuration enamels also conceal other automotive components, such as silver bus bars or antennae, from view from outside the vehicle. Pastes containing silver metal are often printed over the obscuration enamel prior to the firing and bending steps of producing automotive glass such as windshields, sidelites and backlites. Silver ions diffuse quickly at elevated temperatures of 400° C. and above. As a result, the silver ions migrate or diffuse through the obscuration enamel during the bending process when the automotive glass is fired and bent at a temperature ranging from about 600° C. to about 740° C. The silver migration results in a visible staining effect or discoloration in the obscuration enamel. The obscuration enamel, typically having a black color, turns a dark amber, gray or blue as a result of the silver migration.

Resistance to acid, typically from acid rain, includes another necessary quality of obscuration enamels. Previously, automotive manufacturers added polymeric protective molding or encapsulation of the glass edge to prevent acid rain from contacting the enamel itself. In recent years, the use of such methods has declined. Automotive companies have discovered that some enamels will deteriorate in the field when they are exposed to years of acid rain contact. This deterioration can exhibit itself as a change in color, i.e. black to gray, or, in very severe cases, complete removal of the enamel has been seen.

Accordingly, the industry is placing increased demand on higher performance obscuration enamels which possess superior chemical durability, scratch resistance and acid resistance. Further, the tendency of the obscuration enamels to stick to pressing molds during the glass forming process must be minimized or eliminated. During manufacturing, the glass often comes in contact with a pressing mold in order to shape the glass. This mold is usually covered with a woven stainless steel cloth or woven fiberglass cloth. It is important that the enamel has little or no tendency to stick to the cloth. It would be desirable to provide frits for use in high performance obscuration enamels.

SUMMARY

According to one or more embodiments of the present invention, frits and obscuration enamels are provided that are substantially free from $Na_2O$. The obscuration enamel composition according to an embodiment of the present invention includes a paste component and a frit component. One or more embodiments of the present invention prevent silver migration by substantially excluding sodium oxide in the frit component. In addition, in other embodiments of the invention, reducing agents are also used in manufacturing the frit component to prevent silver migration. According to one or more embodiments, the addition of fluoride to the frit component enhances the acid resistance properties of the obscuration enamel composition.

One or more embodiments of the present invention include an obscuration enamel composition comprising a paste component and a frit component. In one embodiment, the frit comprises more than about 20% and less than about 60% by weight of $Bi_2O_3$; about 15% to about 30% by weight of $SiO_2$; and about 2% to about 9% by weight of $B_2O_3$, wherein the composition is substantially free of $Na_2O$. According to one or more embodiments of the present invention, substantially free of $Na_2O$ means that $Na_2O$ is present in an amount in the range of about 0% to 0.2% by weight.

In some embodiments, the obscuration enamel composition is substantially free of $Na_2O$ and further includes a frit comprised of 40% to 50% by weight of $Bi_2O_3$; 20% to 30% by weight of $SiO_2$; and 2% to 5% by weight of $B_2O_3$.

In other embodiments of the present invention, the frit raw batch further includes one or more reducing agents. In some embodiments, the reducing agent used in smelting the frit is a resin, an elemental metal or combinations thereof. One ore more embodiments utilize other reducing agents known in the art. In other embodiments, the frit was produced with one or more reducing agents in an amount ranging from about 0.01% to 0.5% by weight. In other embodiments, the frit composition includes up to 4% by weight of a fluoride.

In further embodiments of the invention, the paste component of the obscuration enamel composition is substantially free of added silicon metal powder In some embodiments, the obscuration enamel includes a frit having additional oxides such as:
about 0% to about 7% by weight of $K_2O$;
about 0% to about 7% by weight of $Li_2O$;
about 0% to about 10% by weight of $SrO$;
about 0% to about 15% by weight of $BaO$;
about 0% to about 15% by weight of $ZnO$;
about 0% to about 5% by weight of $CuO$;
about 0% to about 10% by weight of $La_2O_3$;
about 0% to about 4% by weight of $Al_2O_3$; and
about 0% to about 8% by weight of $TiO_2$.

Other embodiments of the invention utilize the following oxides:
about 0% to about 4% by weight of $K_2O$;
about 0% to about 4% by weight of $Li_2O$;
about 0% to about 5% by weight of $SrO$;
about 0% to about 5% by weight of $BaO$;
about 0% to about 5% by weight of $ZnO$; and
about 0% to about 1% by weight of $Al_2O_3$.

In yet other embodiments of the invention, the frit further comprises additional oxides. Examples of such oxides include $CaO$, $MgO$, $FeO$, $Fe_2O_3$, $ZrO_2$, $SnO_2$, $MoO_3$, $WO_3$, $Nb_2O_5$, $Sb_2O_5$ and combinations thereof.

In one or more embodiments of the invention, the total solids content of the obscuration enamel is greater than about 80% by weight. In other embodiments, the obscuration enamel comprises a frit having particle size of D90 in the range of about 4 μm to about 12 μpm. A specific range is about 4 μm to about 7 μm.

Some embodiments of the obscuration enamel composition include one or more nucleating agents. Other embodiments utilize nucleating agents in obscuration enamel composition such as bismuth silicate, titania, zinc aluminate or combinations thereof.

One or more embodiments of the invention include the obscuration enamel compositions described herein disposed on a surface of an automotive windshield.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

One or more embodiments of the present invention are directed to frit for use in an obscuration enamel composition, the frit being substantially free of $Na_2O$. In another embodiment, such a frit is included in an enamel composition further having a paste component. In a specific embodiment, the frit component comprises from about 20% to about 60% by weight of $Bi_2O_3$, from about 15% to about 30% by weight of $SiO_2$, and from about 2% to about 9% by weight of $B_2O_3$. Some embodiments of the obscuration enamel limit the inclusion of $Na_2O$ to an amount less than about 0.2% by weight.

While the present invention is not intended to be bound by a particular theory of operation, it is believed that enamel compositions that are substantially free of sodium prevent silver migration into the enamel. Silver and sodium have a similar ionic radius, as well as having the same valence state. It is believed that these similarities allow the silver ions to easily diffuse into sodium-containing obscuration enamels via ion-exchange processes. Thus, by excluding $Na_2O$ or limiting its content to less than about 0.2% by weight in the obscuration enamel composition, the migration of silver by ion-exchange processes is prevented and the silver hiding characteristic of the obscuration enamel is enhanced.

Other embodiments of the invention utilize $Bi_2O_3$ in the frit component in an amount in the range of about 20% to about 70% by weight. In other embodiments of the invention, the use of $Bi_2O_3$ in the frit component is further limited to an amount in the range of about 40% to about 50% by weight.

In yet other embodiments of the invention, $SiO_2$ is present in the frit in an amount in the range of about 20% to about 30% by weight.

In other embodiments of the invention, the frit includes $B_2O_3$ in an amount in the range of about 2% to about 5% by weight.

In some embodiments of the present invention, the silver hiding characteristic of the present invention is further improved with the inclusion of a reducing agent in the frit raw batch. Further, reducing agents also alters the oxidation state of the frit. As previously discussed, silver ions diffuse quickly at a temperature of 400° C. or above. Without being limited by theory, reducing agents included in some embodiments of the invention are thought to reduce the silver ions to silver and prevent migration through the obscuration enamel. In one or more embodiments of the present invention, the frit raw batch includes a reducing agent in an amount in the range of about 0.01% to about 0.5% by weight. Other embodiments of the present invention utilize organic reducing agents such as resins, elemental metals and combinations thereof as reducing agents in the frit raw batch. For example, some embodiments of the present invention use a reducing agent of bismuth metal or aluminum metal. Other embodiments of the present invention use ethyl cellulose resin as a reducing agent. Other reducing agents known in the art can also be used in the frit component in other embodiments of the present invention. Examples of suitable reducing agents include, but are not limited to cellulose based resins, polyurethane resins, polyester resins, epoxy resins, alkyd resins, carbon powder, aluminum metal, boron[(o)], zinc metal, and tin metal. It is equally possible to control the atmosphere during melting of the frit. It would be desirable to melt the frit under inert or slightly reducing conditions.

According to one or more embodiments of the present invention, the paste component of the obscuration enamel composition is substantially free of added silicon metal powder.

Other embodiments of the invention have a frit component further comprising fluoride in an amount of up to 4% by weight. According to one or more embodiments, fluoride in an amount at least about 0.15% by weight is included in the frit component.

Without being limited by theory, it is believed that fluoride is an aggressive flux which lowers the melting point of the frit component without substantially increasing its thermal expansion. This allows for the addition of $SiO_2$ which is known to improve acid resistance. It is believed that boron works similarly as a flux but lowers the chemical durability of the frit, in particular resistance to sulfuric acid. Likewise, alkalis lower the melting point of the frit but increase its thermal expansion. Some embodiments of the present invention utilize variations of fluoride in the frit which are known in the art.

Other embodiments of the invention utilize one or more of the following additives in the frit:
  $K_2O$ in an amount in the range of about 0% to about 7% by weight;
  $Li_2O$ in an amount in the range of about 0% to about 7% by weight;
  SrO in an amount in the range of about 0% to about 10% by weight;
  BaO in an amount in the range of about 0% to about 15% by weight;
  ZnO in an amount in the range of about 0% to about 15% by weight;
  CuO in an amount in the range of about 0% to about 5% by weight;
  $La_2O_3$ in an amount in the range of about 0% to about 10% by weight;
  $Al_2O_3$ in an amount in the range of about 0% to about 4% by weight; and
  $TiO_2$ in an amount in the range of about 0% to about 8% by weight.

Other embodiments of the present invention utilize the following components in the frit:
  $K_2O$ in an amount in the range of about 0% to about 4% by weight;
  $Li_2O$ in an amount in the range of about 0% to about 4% by weight;
  SrO in an amount in the range of about 0% to about 5% by weight;
  BaO in an amount in the range of about 0% to about 5% by weight;
  ZnO in an amount in the range of about 0% to about 5% by weight; and
  $Al_2O_3$ in an amount in the range of about 0% to about 1% by weight.

According to other embodiments of the invention, the use of SrO and BaO in the frit is limited to a combined total of about 3% to about 5% by weight. Some embodiments of the obscuration enamel composition further use CaO, MgO, FeO, $Fe_2O_3$, $ZrO_2$, $SnO_2$, $MoO_3$, $WO_3$, $Nb_2O_5$, $Sb_2O_5$ and combinations thereof in the frit component.

One or more embodiments of the obscuration enamel composition have a total solids content greater than 80% by weight. In other specific embodiments, the total solids content of the obscuration enamel composition exceeds 85% by weight. Embodiments having a total solids content of at least 80% by weight can also be characterized as highly dispersed. While not wishing to be bound by theory, highly dispersed obscuration enamel compositions increase the likelihood that a silver ion will encounter a reducing agent, and produce a reaction which prevents silver migration.

Some embodiments of the invention include a frit component having a particle size of D90 between 4 μm to 12 μm. A more specific range is 4 um to 7 um. Frits having a fine particle size range also have a correspondingly high surface area. Without being limited by theory, highly dispersed obscuration enamel compositions have improved silver hiding characteristics because it creates a more arduous path for the silver ions to diffuse during the bending of the glass.

Other embodiments include one or more nucleating agents used in the obscuration enamel composition. This changes the oxidation state of the frit. Nucleating agents aid in crystallizing the enamel, thereby preventing the obscuration enamel from sticking to the bending cloth used to form automotive glass. Some embodiments of the present invention utilize nucleating agents such as bismuth silicate, titania, zinc aluminate or combinations thereof. Yet other embodiments of the invention utilize other nucleating agents known in the art.

In one or more embodiments of the present invention, the obscuration enamel composition is disposed on a surface of an automotive windshield.

Without intending to limit the invention in any manner, the present invention will be more fully described by the following examples.

FRIT EXAMPLES AND COMPARATIVE EXAMPLES

Each frit example was prepared using a general procedure. The general procedure includes batching appropriate raw materials to correspond to the frits A-E. Suitable raw materials were chosen such as carbonates, oxides, fluorides, and nitrates which are well known to those skilled in the art. These batches were melted in ceramic crucibles at approximately 1225° C. for about 20 minutes. The resulting glasses were substantially uniform and fluid. These molten glasses were quenched by pouring immediately into de-ionized water. Other methods known to those skilled in the art such as roll quenching could be used with equal success. The resulting frit was then ball milled to an appropriate particle size. Particle size reduction can be achieved using a variety of methods known to those skilled in the art. Among those methods are dry ball milling, wet ball milling and jet milling. The particle size of the resulting powder had an average particle size of approximately 4 μm as determined with a Horiba LA-300 particle size analyzer.

Comparative Example A contains 1.5% by weight $Na_2O$, no fluoride and the raw batch contained no bismuth metal. Comparative Example B contains 1.0% by weight $Na_2O$, no fluoride and the raw batch contained no bismuth metal. Example C contains no $Na_2O$, 0.68% by weight fluoride and the raw batch contained no bismuth metal. Example D contains no sodium, 0.68% by weight fluoride and the raw batch contained 0.1% by weight bismuth metal. Example E contains no sodium, 1.14% by weight fluoride and the raw batch contained 0.1% by weight bismuth metal. While Examples C-E contain no added sodium, it is believed that the frit can contain up to about 0.2% $Na_2O$, while still having desirable properties when used in an obscuration enamel.

TABLE 1

Composition of Frit A-E

| | Comparative Frit A | Comparative Frit B | Frit C | Frit D | Frit E |
|---|---|---|---|---|---|
| $Na_2O$ | 1.50 | 1.00 | — | — | — |
| $K_2O$ | 0.63 | 1.25 | 0.50 | 0.50 | 1.29 |
| $Li_2O$ | — | 0.33 | 0.44 | 0.44 | 0.48 |
| BaO | — | — | 6.98 | 6.98 | 3.77 |
| SrO | — | 4.40 | 1.97 | 1.97 | 9.58 |
| ZnO | 4.95 | — | — | — | 5.24 |
| $Al_2O_3$ | — | — | 0.76 | 0.76 | 1.03 |
| $Bi_2O_3$ | 64.37 | 58.94 | 58.17 | 58.07 | 48.06 |
| $B_2O_3$ | 8.76 | 6.39 | 6.39 | 6.39 | 4.00 |
| $SiO_2$ | 19.79 | 26.34 | 24.11 | 24.11 | 25.31 |
| $TiO_2$ | — | 1.35 | — | — | — |
| bismuth metal | — | — | — | 0.10 | 0.10 |
| fluoride | — | — | 0.68 | 0.68 | 1.14 |
| Total | 100.00 | 100.00 | 100.00 | 100.00 | 100.00 |
| Frit color | Yellow-Tan | Reddish-Tan | Reddish-Tan | Black | Black |

Enamel Examples A-1-E-1

Obscuration enamel compositions A-1 through E-1 were batched and dispersed using triple roll milling. Alternative dispersion processes known in the industry such as bead milling, sand milling and colloidal milling could also be used to disperse the solid particles in the organic mediums.

TABLE 2

Compositions of Enamel A-1 to E1

| | Comp. Enamel A-1 | Comp. Enamel A-2 | Comp. Enamel B-1 | Enamel C-1 | Enamel C-2 | Enamel D-1 | Enamel E-1 |
|---|---|---|---|---|---|---|---|
| Comparative Frit A | 61.90 | 65.77 | — | — | — | — | — |
| Comparative Frit B | — | — | 61.90 | — | — | — | — |
| Frit C | — | — | — | 61.90 | 65.77 | — | — |
| Frit D | — | — | — | — | — | 65.77 | — |
| Frit E | — | — | — | — | — | — | 65.77 |
| Manganese Iron Nickel Chromite black pigment | 15.20 | 16.15 | 15.20 | 15.20 | 16.15 | 16.15 | 16.15 |

TABLE 2-continued

Compositions of Enamel A-1 to E1

|  | Comp. Enamel A-1 | Comp. Enamel A-2 | Comp. Enamel B-1 | Enamel C-1 | Enamel C-2 | Enamel D-1 | Enamel E-1 |
|---|---|---|---|---|---|---|---|
| Titanium Dioxide Nucleating agent | 2.90 | 3.08 | 2.90 | 2.90 | 3.08 | 3.08 | 3.08 |
| BASF L506 medium | 20.00 | 15.00 | 20.00 | 20.00 | 15.00 | 15.00 | 15.00 |
| Total | 100.00 | 100.00 | 100.00 | 100.00 | 100.00 | 100.00 | 100.00 |
| Solids content | 80.00% | 85.00% | 80.00% | 80.00% | 85.00% | 85.00% | 85.00% |

After milling, the viscosity of each obscuration enamel was determined by measuring with a Brookfield RVF viscometer using spindle #6 at 10 rpm at 25° C. Each of the obscuration enamel examples A-1 through E-1 were printed onto two pieces of 100 mm×100 mm×3.8 mm automotive glass using a 196 mesh screen, resulting in two samples pieces of each obscuration enamel example. The wet film thickness measured between 25 µm to 28 µm. The printed parts were then dried for 10 minutes at 150° C. to evaporate the solvent. The printed parts were then allowed to cool to room temperature.

It was observed that each of the formulas showed excellent printability and had excellent toughness or "green strength". Half of the sample pieces were then over-printed with BASF backlite silver paste A6376XA (78% silver content). These sample pieces were dried under the same conditions described above. The sample pieces were then removed from the drier and allowed to cool to room temperature.

To simulate the heat treatment that a backlite with an obscuration enamel and silver-containing paste is exposed to in a production bending process, the sample pieces printed with BASF backlite silver A6376XA (78% silver content) were fired in a belt furnace under the same firing schedule. The glass itself achieved a temperature of approximately 660° C. The firing cycle was three minutes. The samples pieces without the silver-containing paste were identically fired.

Once these sample pieces had cooled they were inspected and evaluated for quality. All parts had low gloss, indicating that they had developed a substantial crystalline structure which is desirable for press bending applications. The development of a semi-crystalline surface leads to a non-stick surface that is desirable, i.e. the surface of the enamel tends not to stick to the forming mold used in a production bending lehr.

The sample pieces with Inventive Enamels D-1 and E-1 were then partially immersed in 0.1N $H_2SO_4$ at 80° C. for 24 hours in order to evaluate acid resistance.

Comparison of Silver Hiding Ability

The fired parts that had been over-printed with the silver paste were evaluated for silver hiding by inspecting the parts (through the glass) under bright lights.

Comparative Enamel A-1 produced very poor results. It used Comparative Frit A and had a total solids content of 80% by weight. The silver over print was clearly visible when viewed through the glass. The silver "stain" appeared blue and much darker than the surrounding enamel. Comparative Enamel A-1 had very poor acid resistance. After 24 hours of exposure to a hot acid solution, more than 75% of Comparative Enamel Example A-1 was removed from the glass.

Comparative Enamel A-2 also produced very poor results. It used Comparative Frit A, however the solids content was increased from 80% to 85%. There was no significant improvement in either the silver hiding or the acid resistance.

Comparative Enamel B-1 generally produced poor results. It used Comparative Frit B and had a solids content of 80% by weight. The silver over print was seen very easily when viewed through the glass. The silver "stain" appeared amber and much darker than the surrounding enamel. The acid resistance was fair. While Comparative Enamel B-1 remained intact with the substrate, the exposed enamel had changed color significantly when viewed through the glass. Rather than having a dark black color, the Comparative Enamel B-1 was very light gray in color.

Enamel C-1 produced improved results. It used Inventive Frit C and had a total solids content of 80% by weight. The silver over print was slightly noticeable when viewed through the glass. The silver "stain" appeared slightly amber in color and slightly darker than the surrounding enamel. The acid resistance was good. Enamel C-1 remained intact with the substrate and the exposed enamel was slightly gray in color compared to the surrounding enamel when viewed through the glass.

TABLE 3

Comparison of Enamel Properties

|  | Comp. Enamel A-1 | Comp. Enamel A-2 | Comp. Enamel B-1 | Enamel C-1 | Enamel C-2 | Enamel D-1 | Enamel E-1 |
|---|---|---|---|---|---|---|---|
| Acid Resistance | Very Poor | Very Poor | Fair | Good | Very Good | Excellent | Excellent |
| Silver Hiding | Very Poor | Very Poor | Very Poor | Fair | Good | Excellent | Excellent |

Enamel C-2 produced improved results. It also used Inventive Frit C, however its total solids content was increased to 85% by weight. The silver staining was slightly improved, though still visible when viewed through the glass. The acid resistance was slightly improved.

Enamel D-1 produced excellent results. It used Inventive Frit D, which had been smelted using a low level of bismuth metal in order to change the oxidation state of the glass. Further, Inventive Enamel D-1 had a total solids content of 85% by weight. The silver hiding and acid resistance were considered excellent.

Enamel E-1 produced excellent results. It used Inventive Frit E, which had been smelted using a low level of bismuth metal in order to change the oxidation state of the glass. Further, Inventive Enamel E-1 had a total solids content 85% by weight. The silver hiding and acid resistance were considered excellent.

Additional printed trials of Enamels D-1 and E-1 were prepared without any silver over-print. Two parts each were immersed in the hot sulfuric acid solution described earlier. One part of each enamel was removed after 48 hours and 72 hours exposure to the acid.

Comparison of Acid Resistance Ability

After 48 hours of exposure to the acid, Inventive Enamel D-1 remained substantially in contact with the substrate, although the color was significantly gray in color when viewed through the glass.

After 48 hours exposure to the acid, Inventive Enamel E-1 remained in contact with the substrate and exhibited essentially no color change when viewed through the glass.

After 72 hours exposure to the acid, Inventive Enamel D-1 was substantially removed from the glass substrate.

After 72 hours exposure to the acid, Inventive Enamel E-1 remained in contact with the substrate and exhibited essentially no color change when viewed through the glass.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An obscuration enamel composition comprising:
   a paste component; and
   a frit component comprising
   $Bi_2O_3$ in an amount in the range of about 20% to about 60% by weight;
   $SiO_2$ in an amount in the range of about 15% to about 30% by weight;
   $B_2O_3$ in an amount in the range of from about 2% to about 9% by weight; and
   two or more oxides selected from SrO, BaO and ZnO in an amount greater than about 8.95% by weight,
   wherein the composition is substantially free of $Na_2O$ and the frit component comprises about 0% by weight $TiO_2$.

2. The obscuration enamel composition of claim 1, wherein the frit component has a particle size of D90 in the range of about 4 μm to about 12 μm.

3. The obscuration enamel composition of claim 1 further comprising one or more nucleating agents.

4. The obscuration enamel composition of claim 3, wherein the nucleating agents are selected from a group consisting of bismuth silicate, titania, zinc aluminate and combinations thereof.

5. The obscuration enamel composition of claim 4, wherein the frit component further comprises $Na_2O$ in an amount less than about 0.2% by weight and the paste component is substantially free of added silicon metal powder.

6. The obscuration enamel composition of claim 5, wherein the frit component comprises one or more reducing agents smelted therein.

7. The obscuration enamel composition of claim 5, wherein the frit component comprises:
   $Bi_2O_3$ in an amount in the range of about 40% to about 50% by weight;
   $SiO_2$ in an amount in the range of about 20% to about 30% by weight; and
   $B_2O_3$ in an amount in the range of about 2% to about 5% by weight.

8. The obscuration enamel composition of claim 7, wherein the frit component further comprises at least one member selected from the group consisting of:
   $K_2O$ in an amount in the range of about 0% to about 7% by weight;
   $Li_2O$ in an amount in the range of about 0% to about 7% by weight;
   CuO in an amount in the range of about 0% to about 5% by weight;
   $La_2O_3$ in an amount in the range of about 0% to about 10% by weight;
   $Al_2O_3$ in an amount in the range of about 0% to about 4% by weight, and
   fluoride in an amount in the range of 0% to about 4% by weight.

9. The obscuration enamel composition of claim 8 having total solids content in an amount greater than about 80% by weight.

10. An automotive glass comprising the obscuration enamel composition of claim 1 disposed on a surface of the glass.

11. An automotive glass comprising the obscuration enamel composition of claim 3 disposed on a surface of the glass.

12. An obscuration enamel composition comprising:
    a paste component; and
    a frit component comprising
    $Bi_2O_3$ in an amount in the range of about 20% to about 60% by weight;
    $SiO_2$ in an amount in the range of about 20% to about 26% by weight; and
    $B_2O_3$ in an amount in the range of about 2% to about 5% by weight; and
    two or more oxides selected from SrO, BaO and ZnO;
    wherein the composition has a solids content over 85% by weight and is substantially free of $Na_2O$ and the frit component comprises about 0% by weight $TiO_2$.

13. The obscuration enamel composition of claim 12 further comprising one or more nucleating agents.

14. The obscuration enamel composition of claim 13, wherein the one or more nucleating agents are selected from a group consisting of bismuth silicate, titania, zinc aluminate and combinations thereof.

15. The obscuration enamel composition of claim 14, wherein the frit component further comprises $Na_2O$ in an amount less than about 0.2% by weight and the paste component is substantially free of added silicon metal powder.

16. The obscuration enamel composition of claim 15, wherein the frit component comprises one or more reducing agents smelted therein.

17. The obscuration enamel composition of claim 15, wherein the frit component further comprises at least one member selected from the group consisting of:

$K_2O$ in an amount in the range of about 0% to about 7% by weight;

$Li_2O$ in an amount in the range of about 0% to about 7% by weight;

CuO in an amount in the range of about 0% to about 5% by weight;

$La_2O_3$ in an amount in the range of about 0% to about 10% by weight;

$Al_2O_3$ in an amount in the range of about 0% to about 4% by weight; and fluoride in an amount in the range of 0% to about 4% by weight.

18. The obscuration enamel composition of claim 12, wherein the frit component has a particle size of D90 in the range of about 4 μm to about 12 μm.

19. An automotive glass comprising the obscuration enamel composition of claim 12 disposed on a surface of the glass.

20. An automotive glass comprising the obscuration enamel composition of claim 13 disposed on a surface of the glass.

* * * * *